(12) United States Patent
Christian

(10) Patent No.: US 10,233,029 B2
(45) Date of Patent: Mar. 19, 2019

(54) CONVEYOR BELT SCRAPER

(71) Applicant: BRELKO PATENTS (PTY) LTD, Johannesburg (ZA)

(72) Inventor: Paul Christian, Johannesburg (ZA)

(73) Assignee: BRELKO PATENTS (PTY) LTD., Johannesburg (ZA)

( * ) Notice: Subject to any disclaimer, the term of this patent is extended or adjusted under 35 U.S.C. 154(b) by 0 days.

(21) Appl. No.: 15/750,016

(22) PCT Filed: Jun. 14, 2016

(86) PCT No.: PCT/ZA2016/050019
§ 371 (c)(1),
(2) Date: Feb. 2, 2018

(87) PCT Pub. No.: WO2017/024323
PCT Pub. Date: Feb. 9, 2017

(65) Prior Publication Data
US 2018/0229943 A1  Aug. 16, 2018

(30) Foreign Application Priority Data
Aug. 4, 2015 (ZA) .................... 2015/05592

(51) Int. Cl.
*B65G 45/16* (2006.01)
*B65G 45/12* (2006.01)
*B08B 1/00* (2006.01)
*B08B 1/02* (2006.01)

(52) U.S. Cl.
CPC ........... *B65G 45/16* (2013.01); *B08B 1/005* (2013.01); *B65G 45/12* (2013.01); *B08B 1/02* (2013.01)

(58) Field of Classification Search
CPC ................ B65G 45/12; B65G 45/16
USPC .................................. 198/497, 499
See application file for complete search history.

(56) References Cited

U.S. PATENT DOCUMENTS

| | | | |
|---|---|---|---|
| 5,865,294 A * | 2/1999 | Betz | B65G 45/12 198/497 |
| 6,315,105 B1 | 11/2001 | Gibbs et al. | |
| 6,926,133 B2 * | 8/2005 | Kolodziej | B65G 45/12 198/493 |
| 8,393,459 B2 * | 3/2013 | Childs | B65G 45/12 198/497 |
| 9,586,765 B2 * | 3/2017 | Krosschell | B65G 45/16 |
| 9,738,456 B1 * | 8/2017 | Grimm | B65G 45/16 |
| 2005/0023110 A1 | 2/2005 | Brink | |
| 2006/0021854 A1 * | 2/2006 | Waters | B65G 45/12 198/497 |
| 2012/0247922 A1 * | 10/2012 | Waters | B65G 45/12 198/499 |
| 2015/0274434 A1 * | 10/2015 | DeVries | B65G 45/14 198/497 |

FOREIGN PATENT DOCUMENTS

| | | |
|---|---|---|
| GB | 2290276 A | 12/1995 |
| WO | 2003/074393 A1 | 9/2003 |
| WO | 2008/014342 A2 | 1/2008 |

* cited by examiner

*Primary Examiner* — James R Bidwell
(74) *Attorney, Agent, or Firm* — Tutunjian & Bitetto, P.C.

(57) ABSTRACT

A conveyor belt scraper (44) which has a molded base (10), a scraper element (46) which is molded to the base (10), and resiliently compressible inserts (80, 82) between relatively movable opposed surfaces of the base (10) and the scraper element (46).

8 Claims, 4 Drawing Sheets ic # CONVEYOR BELT SCRAPER

BACKGROUND OF THE INVENTION

This invention relates to a conveyor belt scraper and to a base for use with a belt scraper.

One type of conveyor belt scraper is made from a tough resiliently deformable material such as polyurethane. Typically, this type of belt scraper, which is integrally moulded, has a retention formation which is engageable with a sliding action with a suitable channel in a holder. Some properties which make polyurethane suitable for use as a scraper can however present problems during installation and recovery of the scraper, when worn. This is because the polyurethane is "sticky" and tends to cling to a holder, resisting relative sliding movement.

Another type of scraper has a base which is square in cross-section and which is positioned inside a tubular holder which is also of square cross-section. There is an offset between the base and the holder so that, inside the holder, four triangular voids are formed at respective corners of the holder. Each void is occupied by a compressible rubber insert. The positioning of each rubber insert can be arduous for it is necessary to freeze each insert, using liquid nitrogen, so that the insert can be placed in position. The use of liquid nitrogen is expensive and assembly of the scraper requires a fair amount of labour.

An object of the present invention is to address, at least to some extent, the aforementioned factors.

SUMMARY OF THE INVENTION

The invention provides a base for a conveyor belt scraper which includes an elongate body of uniform cross-section which includes a bridging piece with a first surface and a second surface which is opposed to the first surface, a retention component which is located on the second surface and, on the first surface, spaced apart first and second legs which define a gap between them.

Preferably the retention component is centrally located on the second surface. In cross section the body may be symmetrical about a centre line which passes between the first and second legs and through the retention component.

The retention component may include a neck which extends from the second surface and, at an end of the neck which is displaced from the second surface, the retention component may include a retention member which is larger in size than the neck.

The retention member may be of an appropriate shape but preferably is substantially circular in cross-section.

The body may be made from a material which allows the body to be slid into engagement with a holder, or to be slid out of engagement with a holder, with relative ease. The body may for example be made from a non-ferrous material (to counter the effects of corrosion) or from a plastics material e.g. a suitable nylon which is reinforced with glass or the like. This is exemplary only and non-limiting.

The body may be formed from an extrusion which is cut, as appropriate, to a suitable length. Alternatively the body is formed in a moulding or other working process.

The invention also extends to a conveyor belt scraper which includes a base of the aforementioned kind and, moulded to the body and thereby adhering to the body, a scraper element comprising a scraper member which terminates in a scraping end or which has provision for a scraping blade to be attached to it.

The scraper member may be made from a material such as polyurethane which is more flexible (less rigid) than a material used in the body. Preferably the scraper member is integrally moulded over the body so that, for all practical purposes, a conveyor belt scraper of unitary integral construction is provided.

In another form of the invention the conveyor belt scraper includes a base of the aforementioned kind, a scraper element comprising a scraper member which includes an undercut recessed formation which is engaged with the retention component and, on respective opposed sides of the retention component, a resiliently compressible insert which abuts the scraper member and which is positioned between the retention component and an adjacent portion of the second surface of the body.

The arrangement may be one in which the scraper member is pivotally movable about an axis to a limited extent against a biasing action exerted by the respective insert which is resiliently compressed by such pivotal movement.

The axis may be formed by, or pass through, the retentive member. Each insert is respectively positioned between a part of the second surface of the body and a part of a surface of the neck and an adjacent surface of the retention member.

BRIEF DESCRIPTION OF THE DRAWINGS

The invention is further described, by way of examples, with reference to the accompanying drawings in which.

DESCRIPTION OF PREFERRED EMBODIMENT

Figure 1:
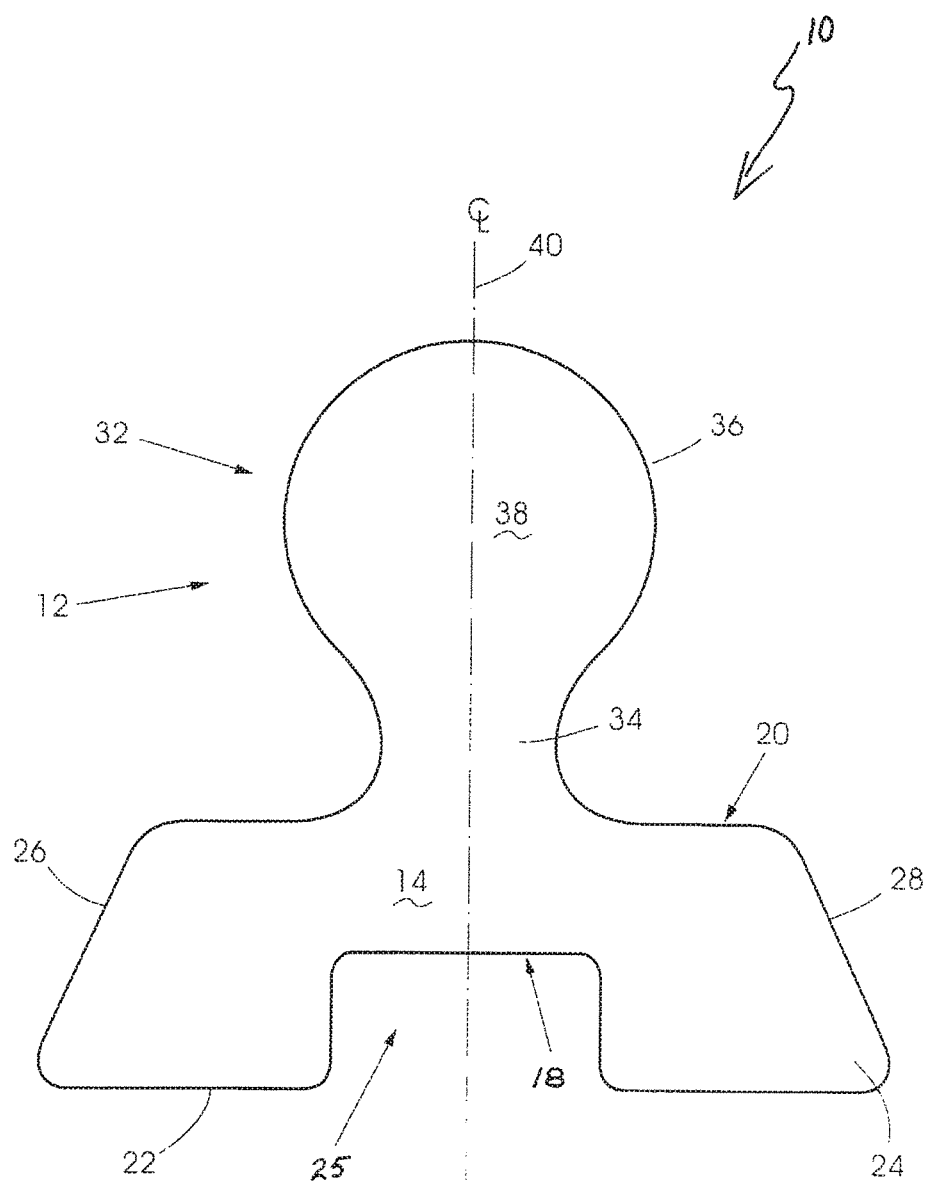
FIG. 1 is an end view of a base for a conveyor belt scraper according to the invention.

FIG. 1 of the accompanying drawings is an end view of a base 10 according to the invention.

The base 10 includes an elongate body 12 of generally uniform cross-section which includes a bridging piece 14 which has a lower or first surface 18 and an opposed upper or second surface 20.

Spaced apart first and second legs 22 and 24 respectively which define a gap 25 between them are located on the first surface. Respective outer sides 26 and 28 of the legs 22 and 24 slope outwardly away from each other, moving downwardly from the second surface.

A retention component 32 is centrally positioned on the second surface 20. The retention component has a neck 34 and an enlarged formation 36 which is generally of circular cross-section and which forms a retention member 38.

The body 12 is generally symmetrical about a centre line 40 which passes between the first leg 22 and the second leg 24 and through the retention component 32.

The body 12 of the base can be formed in any suitable way e.g. in a moulding process or from a suitable extrusion which is cut to length as required. The base has a length 42 (See FIG. 3) which is suitably determined to accommodate the dimensions of a holder.

The body 12 may be made from a non-ferrous metal e.g. aluminium, so that it is resistant to corrosion. Preferably though the body is made from a hard plastics material, such as nylon, which is suitably reinforced. Other materials can be used. The use of nylon is exemplary only.

Figure 2:
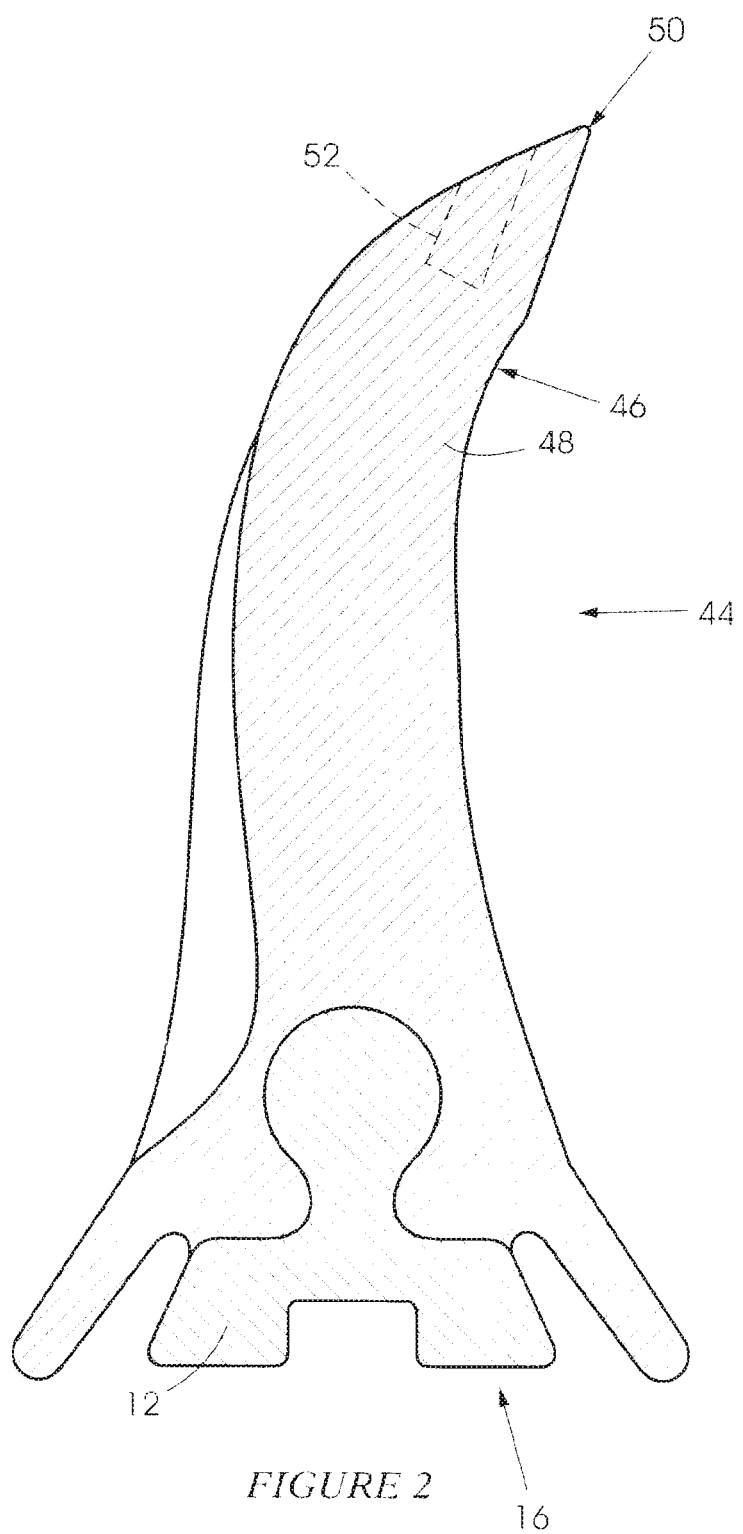
FIG. 2 illustrates a conveyor belt scraper which is made using a base of the kind shown in FIG. 1.

FIG. 2 illustrates a conveyor belt scraper 44 which is made using the base 10 shown in FIG. 1. The body 12 is inserted into a suitable mould and, using an injection moulding process, a conveyor belt scraper element 46 is then over-moulded onto the base. The element 46 comprises a scraper member 48 which is made from polyurethane, a material which has properties which make it suitable for use in a scraping application. A leading edge 50 of the scraper member 48 defines a scraping surface. Alternatively, the leading edge 50 is formed with a slot 52, shown in dotted outline, to receive a scraper blade, (not shown), as is known in the art.

The over-moulding process bonds the element 46 to the body 12 and thereby forms an integral scraper.

A benefit of the construction described is that the body 12 is accurately formed and is not subjected to dimensional tolerances which typically are encountered when working with polyurethane. This means that, in use, the body 12 can be engaged with a suitable holder, using a sliding action, relatively easily. The "stickiness", or resistance to relative sliding movement typically associated with polyurethane, is avoided. Also, when the scraper member 48 has been worn and is to be replaced, removal of the scraper 44 from the holder can readily be accomplished.

Figure 3:
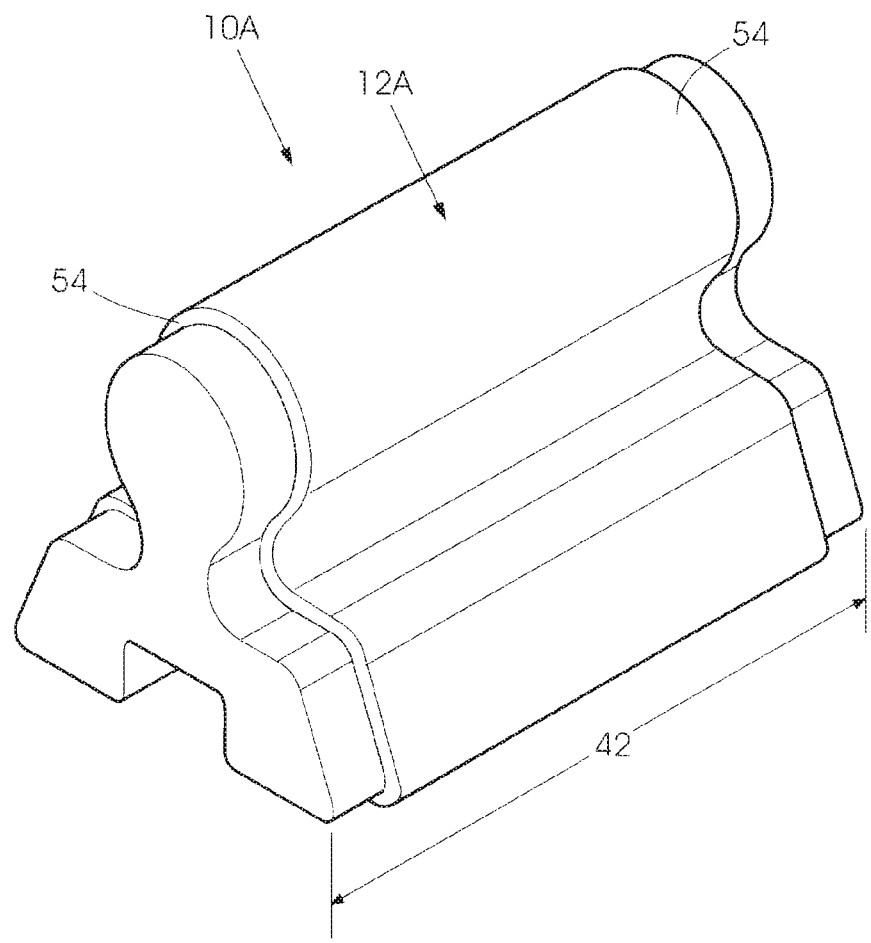
FIG. 3 shows a slightly different form of the base of the invention in perspective.

FIG. 3 illustrates a base 10A wherein a body 12A of the base has a respective small step 54 at each of its opposed ends. However, the cross-sectional shape is otherwise maintained.

Figure 4:
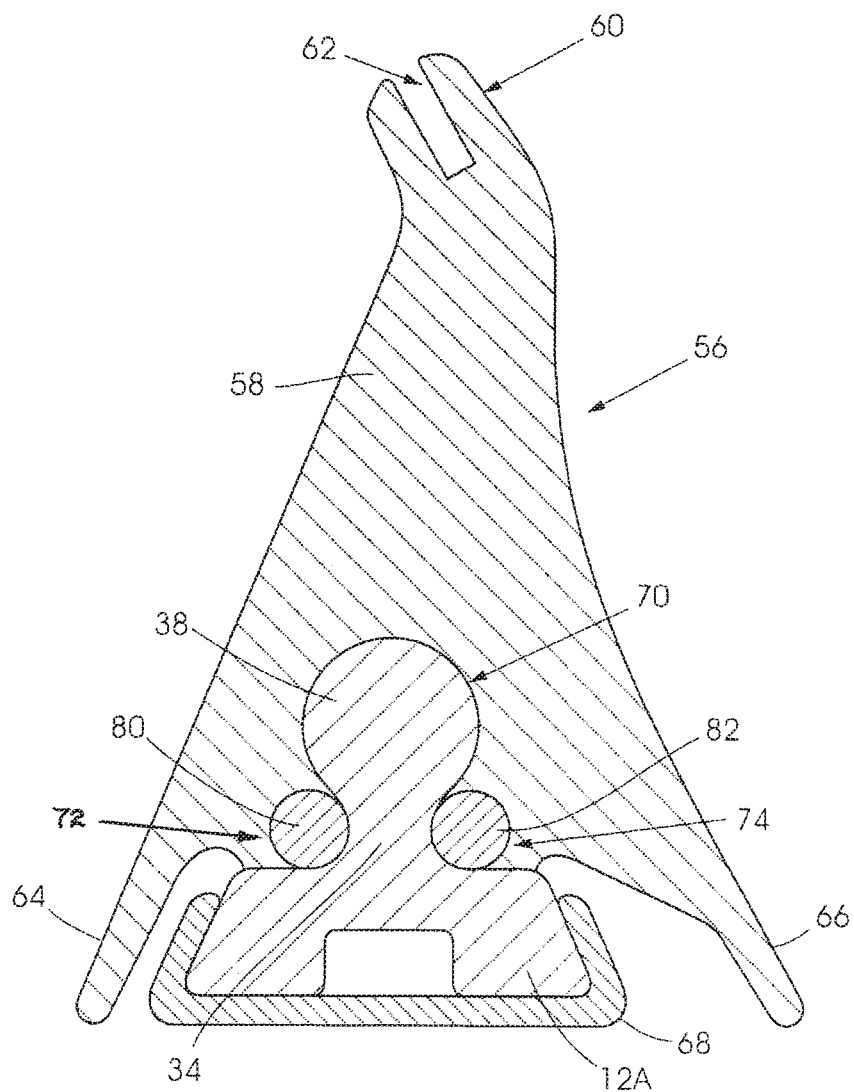
FIG. 4 illustrates how a scraper which includes the base shown in FIG. 3 is mounted to a conveyor belt holder, in use.

The body 12A is designed to be used with a scraper element 56 of the shape shown in FIG. 4. The scraper element 56 has a scraper member 58 which terminates in a tip 60. A slot 62 formed into the tip accommodates a scraper blade (not shown) which is inserted and fixed in position using techniques which are known in the art. On opposed sides the scraper member 58 has two skirts 64 and 66 respectively which overlie outer sides of an injection-moulded nylon holder 68.

The holder 68 is of complementary shape to the sloping sides 26 and 28, and to the undersides, of the legs 22 and 24. This allows the body 12A to be engaged with a sliding action with the holder, in a secure and effective manner, and to be disengaged from the holder, with similar ease, when required.

In this form of the invention the scraper element is not over-moulded onto the base but is separately formed and is engaged with the base when required. A tubular formation 70 which corresponds in shape to the cross-sectional shape of the retention member 38 of the body, extends through the scraper member 58. Voids 72 and 74 are formed on opposed sides of the neck 34 between opposing surfaces of the body 12A and of the scraper member 58. These voids allow the scraper member to be pivoted to a limited extent relative to the body, in one direction or the other, with the retention member 38, which is of generally circular outline, acting as a pivot or hinge axis.

In order for the pivotal movement to take place in a controlled manner rubber inserts 80 and 82 are respectively pushed into the voids 72 and 74. To facilitate this, the scraper member 58 is pivoted in one direction to enlarge one void (72 or 74) and then the respective insert (80 or 82) is placed into the enlarged void. When the scraper member is moved in the opposing direction the insert (80 or 82), already in place, is compressed and when the other void (72 or 74) is sufficiently large, the other insert (80 or 82) is inserted. This technique also means that the inserts 80, 82 can be pre-loaded, i.e. compressed to some extent, during the assembly process.

In use of the scraper, pivotal movement of the scraper element relative to the base can take place against a resisting compressive force of the respective insert.

The arrangement shown in FIG. 4 means that the use of the square base and holder and the use of liquid nitrogen referred to in the preamble hereof.

The small steps 54 at opposed ends of the body 12A define rebates. End cap, not shown, can be engaged with the rebates to seal an interior of the scraper (i.e. that portion of the scraper which accommodates the inserts) against the ingress of foreign material—this feature helps to counter wear and tear, and corrosion.

The invention claimed is:

1. A base for a conveyor belt scraper comprising:
an elongate body of uniform cross-section having a bridging piece having a first surface and a second surface opposed to the first surface;
a retention component disposed on the second surface;
on the first surface, spaced apart first and second legs which define a gap between them;
a scraper element having a scraper member which includes an undercut recessed formation which is engaged with the retention component; and
on respective opposed sides of the retention component, a respective resiliently compressible insert which abuts the scraper element and which is positioned between the retention component and an adjacent portion of the second surface of the body.

2. The base according to claim 1, wherein in cross-section the elongate body is symmetrical about a centre line which passes between the first and second legs and through the retention component.

3. The base according to claim 1, wherein the retention component further comprises a neck which extends from the second surface and, at an end of the neck which is displaced from the second surface, the retention component includes a retention member which is larger in size than the neck.

4. The base according to claim 3, wherein the retention member is substantially circular in cross-section.

5. The base according to claim 1, wherein the elongate body is made from a non-ferrous material or from a reinforced nylon.

6. The base according to claim 1, wherein the scraper element is moulded to the body and thereby adhered to the body, wherein the scraper member terminates in a scraping end or which has provision for a scraping blade to be attached thereto.

7. The conveyor belt scraper according to claim 1, wherein the scraper member is made from a material which is less rigid than the material from which the body is made.

8. The conveyor belt scraper according to claim 1, wherein the scraper member is pivotally movable, about an axis formed by the retention member, to a limited extent against a biasing action exerted by the respective insert which is resiliently compressed by such pivotal movement.

* * * * *

UNITED STATES PATENT AND TRADEMARK OFFICE
CERTIFICATE OF CORRECTION

PATENT NO.         : 10,233,029 B2
APPLICATION NO.    : 15/750016
DATED              : March 19, 2019
INVENTOR(S)        : Paul Christian Page 1 of 1

It is certified that error appears in the above-identified patent and that said Letters Patent is hereby corrected as shown below:

In Column 4 Claim 1, Line 1, delete "base" and insert therefor --conveyor belt scraper--;

In Column 4 Claim 2, Line 1, delete "base" and insert therefor --conveyor belt scraper--;

In Column 4 Claim 3, Line 1, delete "base" and insert therefor --conveyor belt scraper--;

In Column 4 Claim 4, Line 1, delete "base" and insert therefor --conveyor belt scraper--;

In Column 4 Claim 5, Line 1, delete "base" and insert therefor --conveyor belt scraper--; and In Column 4 Claim 6, Line 1, delete "base" and insert therefor --conveyor belt scraper--.

Signed and Sealed this
Second Day of February, 2021

Drew Hirshfeld
*Performing the Functions and Duties of the
Under Secretary of Commerce for Intellectual Property and
Director of the United States Patent and Trademark Office*